United States Patent [19]

Wagner

[11] Patent Number: 4,598,624
[45] Date of Patent: Jul. 8, 1986

[54] VACUUM-OPERATED BRAKE POWER BOOSTER

[75] Inventor: Wilfried Wagner, Hattersheim, Fed. Rep. of Germany

[73] Assignee: ITT Industries, Inc., New York, N.Y.

[21] Appl. No.: 660,467

[22] Filed: Oct. 12, 1984

[30] Foreign Application Priority Data

Oct. 19, 1983 [DE] Fed. Rep. of Germany ....... 3337981
Oct. 22, 1983 [DE] Fed. Rep. of Germany ....... 3338458

[51] Int. Cl.$^4$ ............................................. F15B 9/10
[52] U.S. Cl. ................................. 91/369 R; 91/376 R
[58] Field of Search ............. 91/369 A, 369 B, 369 R, 91/376 R; 60/547.1, 554

[56] References Cited

U.S. PATENT DOCUMENTS 4,472,997 9/1984 Ohmi ............................... 91/369 A

FOREIGN PATENT DOCUMENTS 2493784 5/1982 France ............................. 91/369 A
2064690 6/1981 United Kingdom ............. 91/369 A
2065809 7/1981 United Kingdom ............. 91/369 A
2074677 11/1981 United Kingdom ............. 91/369 A Primary Examiner—Robert E. Garrett
Assistant Examiner—Mark A. Williamson
Attorney, Agent, or Firm—James B. Raden; Donald J. Breh

[57] ABSTRACT

A vacuum-operated brake power booster, provided with a control valve comprising a control valve piston with its valve body actuated by a piston rod and having a poppet valve with two valve seat faces and a valve seat at the longitudinally slidable control valve body. The movements of the poppet valve relative to the two valve seats are controlled by a transverse member whose radially external end touches against a stationary sealing ring of the housing of the booster in the release position of the brake. For the interaction of the poppet valve with the transverse member, the liner of the poppet valve is furnished with at least one opening whose width is larger than the thickness of the transverse member which engages in that groove. Due to the transverse member touching the stationary sealing ring, the lost motion of the valve is reducible to zero.

9 Claims, 3 Drawing Figures

VACUUM-OPERATED BRAKE POWER BOOSTER

A related application is filed of evendate herewith under a like title by J. Belart.

The invention relates to a vacuum-operated brake power booster with an axially movable wall sealed relative to the vacuum housing. A piston rod coupled to a brake pedal serves to actuate a control valve by means of which a power chamber of the brake power booster is selectively connected either to vacuum or to a more elevated differential pressure. In the brake power booster a first valve is formed by a valve seat in the control valve body with a poppet valve preloaded in the direction of the valve seat. A second valve is formed by both that same poppet valve and a control valve piston connected to the piston rod. The axially movable wall is in effective linkage with the control valve body and with a guide provided in the control valve body. The guide extends at right angles to the longitudinal axis of the control valve body and is in effective linkage with a transverse member penetrating through the guide. One free end of the transverse member projects beyond the peripheral surface of the control valve body and touches against the stationary vacuum housing in the release position of the brake.

BACKGROUND OF THE INVENTION

Conventional vacuum-operated brake power boosters as a rule have a housing in which there is an axially movable wall which is adapted to be reciprocated within the housing, the wall dividing the inner space of the housing into two chambers. By means of the two chambers, a pressure difference can be generated on the opposite sides of the movable wall. The pressure difference results in the movable wall being shifted from the higher pressure in the direction of the lower pressure. A vacuum-operated brake power booster of this type furthermore comprises a control valve which is actuated through the brake pedal and which controls the amount of vacuum acting on the one side of the axially movable wall. As a rule, the axially movable wall is connected to the brake master cylinder of a hydraulic braking system of the automotive vehicle in such a manner that when the pressure difference has its effect on the movable wall causing movement of the movable wall, brake fluid is displaced from the brake master cylinder into the hydraulic braking system to apply the wheel brakes of the vehicle.

In the design of braking systems for automotive vehicles, it is expedient to configure the vacuum-operated brake power booster in such a manner that the brake response phase during which the vehicle driver moves the brake pedal and interrupts the connected of flow between the two sides of the axially movable wall by means of the control valve is reduced to a minimum.

A brake power booster of the kind generally shown herein is known from German printed and published patent application 3,042,096 Al. In that reference, a wedge is provided which is seated with play both in the control valve piston and in the control valve body. The wedge is adapted to come into abutment with the housing of the brake power booster in such a way that in the release position of the brake, the vacuum valve seat is lifted a minute distance from the poppet valve. That known brake power booster has the disadvantage that the potential lost motion cannot be completely reduced to zero.

SUMMARY OF THE INVENTION

The present invention has, as its major object to create a brake power booster for an automotive vehicle braking system in which the response phase of brake actuation is reducible to zero and in which higher pressure is directly exerted on one side of the booster movable wall when the driver moves the brake pedal in order to actuate the control valve of the brake power booster.

According to the invention, this object is achieved in that the control valve includes a poppet valve furnished with a front area acting as a valve seat located at its end facing the control valve piston. The poppet valve is armored by a liner having a portion which projects beyond the front area in the axial direction, the linear being provided with at least one recess or opening engaged by a radially extending transverse member.

Preferably, the liner which extends the poppet valve in the axial direction is configured as a bushing and is furnished with recesses or openings into which extend the arms of the transverse member. These arms are disposed parallel to each other and extend from an internal radial surface of the transverse member and form part of the fork-shaped transverse member. The free ends of the transverse member project outwardly beyond the liner in the radial direction extending through a guide arranged in the control valve body, the free ends touching against the stationary sealing ring of the vacuum housing with the brake in its release position.

Advantageously, the recesses or openings in the liner have sufficient width for the transverse member to penetrate through them with play, permitting a generally unobstructed passage of air in the radial direction.

At its end facing the brake pedal, the bushing-type liner is provided with radially extending arms or with a flange which is at least partially embedded in the rubbery-elastomeric material of the poppet valve and which stiffens the valve seat faces at the front area and/or the shoulder of the poppet valve.

Preferably, the width of the guide is sized such that in the release position of the brake when the transverse member abuts against the stationary rubber sealing ring, play is preserved on both sides of the transverse member between the control valve body on the one hand and the transverse member on the other hand.

The transverse member extends through the guide in the control valve body in the radial direction to retain an effective linkage directly with the poppet valve and with its radially internal end. For this purpose the transverse member either engages a recess provided at the poppet valve or may be rigidly coupled to the liner in one or more ways.

According to the invention, the radial internal surface of the transverse member has a fork-shaped configuration and with its two parallel radially extending arms embraces opposite sides of the neck of the control valve body in the range of the control valve piston with a tolerance or play, the center portions of those arms being in effective linkage with the liner of the poppet valve.

In this configuration, a recess is provided at the poppet valve or at the liner for the transverse member. The recess is designed as a circumferential groove or notch arranged at that end of the poppet valve or of the liner which faces the control valve piston.

In a preferred embodiment, the end of the poppet valve which is adjacent the piston rod is rigidly coupled to the control valve body, the bellows-shaped portion of the poppet valve being located between the portion provided with a shoulder and the rigidly fixed end on the side of the piston rod.

Expediently, the end of the poppet valve which is positioned adjacent the control valve piston and provided with the shoulder is subjected to the force of a spring in the closing direction, the spring being supported on a shoulder of the piston rod on one side and abutting against an internal step of the inside wall of the poppet valve in the range of the shoulder on the other side.

BRIEF DESCRIPTION OF THE DRAWINGS

The principle of the present invention is capable of use in a number of possible embodiments, one of which is shown in more detail in the accompanying drawings, in which.

DETAILED DESCRIPTION

Figure 1:
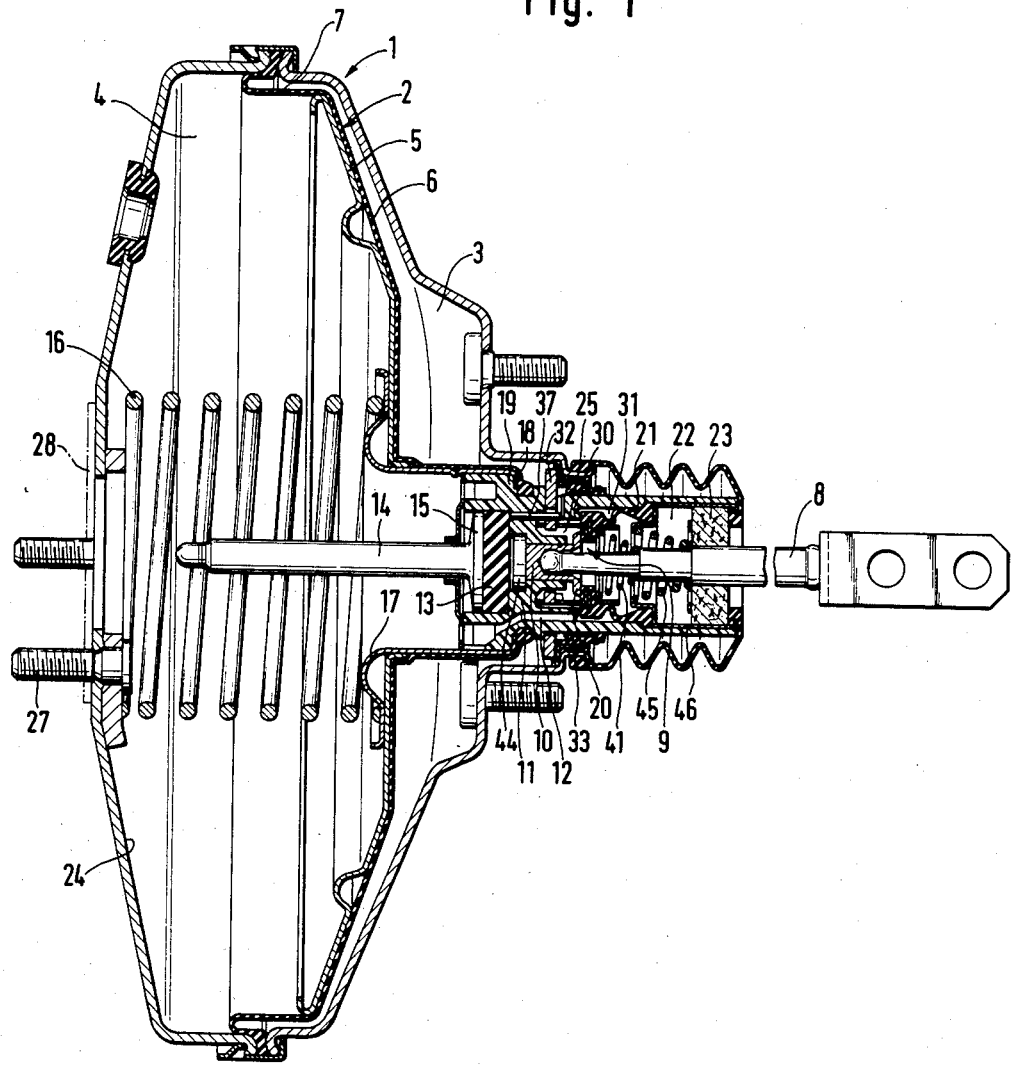
FIG. 1 is a longitudinal section through a vacuum brake power booster using the present invention, the booster as shown being in the release position and shown with the accompanying master cylinder deleted.
Figure 3:
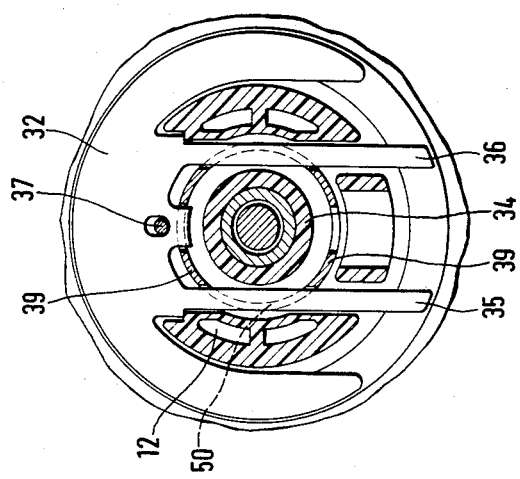
FIG. 3 is a cross-section through the control valve of the brake power booster showing the transverse member in side elevation.

The brake power booster shown in FIG. 1 is provided with a vacuum housing 1 which is divided into a power chamber 3 and a vacuum chamber 4 by means of an axially movable wall 2. The axially movable wall 2 comprises a dished diaphragm disc 5 of deep-drawn sheet or plate metal and a flexible diaphragm 6 snugly adhering to it and forming a rolling diaphragm 7 as a seal between the periphery of the dished diaphragm disc 5 and the vacuum housing 1.

A control valve 9 actuatable by a brake pedal controlled piston rod 8 is furnished with a control valve piston 10 linked to the piston rod 8. Valve 9 controls valve openings within control valve body 11 in such a way that in the non-actuated position or release position as shown in FIG. 1, the power chamber 3 is separated from the vacuum chamber 4, since the passage through the air guide ducts 12 running laterally within the control valve body 11 and on the front side terminating at the periphery of the control valve body 11 is interrupted. In the event of actuation of the control valve 9, that is in the event of an axial slide of the piston rod 8, the connection from the vacuum chamber 4 toward the power chamber 3 remains interrupted, the power chamber 3 being, however, connected or open to with the atmosphere so that the movable wall 2 moves in the direction of the vacuum chamber 4.

By means of a rubbery-elastomeric reaction disc 13 fastened in a front-side depression of the control valve body 11 and by means of a push-rod 14 provided with a head flange 15, braking power is transmitted to an actuating piston of a braking system master cylinder through push rod 14. (The master cylinder which is mounted at the vacuum-side end of the brake power booster is not shown in the drawings.)

A compression spring 16 supported on the inside wall 24 of the vacuum housing 1 and on the diaphragm disc 5 maintains the movable wall 2 in the initial or release position shown in the drawing.

The diaphragm disc 5 comprises a cup-shaped hub portion 17 from which a retaining flange 18 projects radially inwardly and is in abutment against a shoulder 19 of the control valve body 11.

Within the control valve body 11, the control valve piston 10 is retained and guided in such a manner that in the event of a slide of the piston rod 8 in the direction of the arrow A (full braking position) the valve seat 20 lifts off the poppet valve 21 permitting the inflow of atmospheric air into the annular chamber 25 from the chamber 22 which is in connection with the ambient air via a filter 23. The annular chamber 25, in turn, is in connection with the power chamber 3 via a guide 26 extending radially through the control valve body 11 and via a duct 38 formed by a groove, so that air at atmospheric pressure flows in and up into the power chamber 3. The air moves the axially movable wall 2 in the direction toward the inside wall 24 against the force of the spring 16. Since the axially movable wall 2 is connected to the control valve body 11, the push-rod 14 will also move to the left and exert force upon the master cylinder secured to the flange 28 of the vacuum housing 1 by means of the screw bolts 27.

When the piston rod 8 is moved back into its initial position (return) in the direction opposite to that indicated by the arrow A under the force of the retractor spring 45, the valve seat 20 of the control valve piston 10 will then come to be seated once again on the poppet valve 21, shutting off the air passage from the chamber 22 to the annular chamber 25 and, consequently, to the power chamber 3. During this return operation, the control valve body 11 moves to the right sufficiently for the shoulder 29 of poppet valve 21 to be lifted off the valve seat 30 of the control valve body 11. This movement establishes a connection from the power chamber 3 via a path through the guide 26, the duct 38, and the annular chamber 25 to the annular chamber 31 and from the latter via the air guide duct 12 to the vacuum chamber 4.

As a result of the equalization of pressure between the vacuum chamber 4 and the power chamber 3, the axially movable wall 2 moves to the right together with the control valve body 11 until the transverse member 32 touches against the sealing ring 33 which is rigid with the vacuum housing 1, thereby closing the passage between the valve seat 30 and the shoulder 29 of the poppet valve 21 (release position).

With the aid of its arms 35 and 36, the transverse member 32 partly embraces neck 34 of the control valve body 11 and is secured against a radial shift at the control valve body 11 by means of a stud 37. In axial direction, the transverse member 32 is slidable relative to the control valve body 11 through an exactly predetermined distance resulting from the width b of the guide 26 and the thickness f of the transverse member 32. The extent of slidability of the transverse member 32 predetermines, in turn, the maximum opening travel of the poppet valve 21 relative to the two valve seats 20 and 30, since the movement of the shoulder 29 of the poppet valve 21 is determined by the width g of the openings 50 of the bushing-type liner 39.

Figure 2:
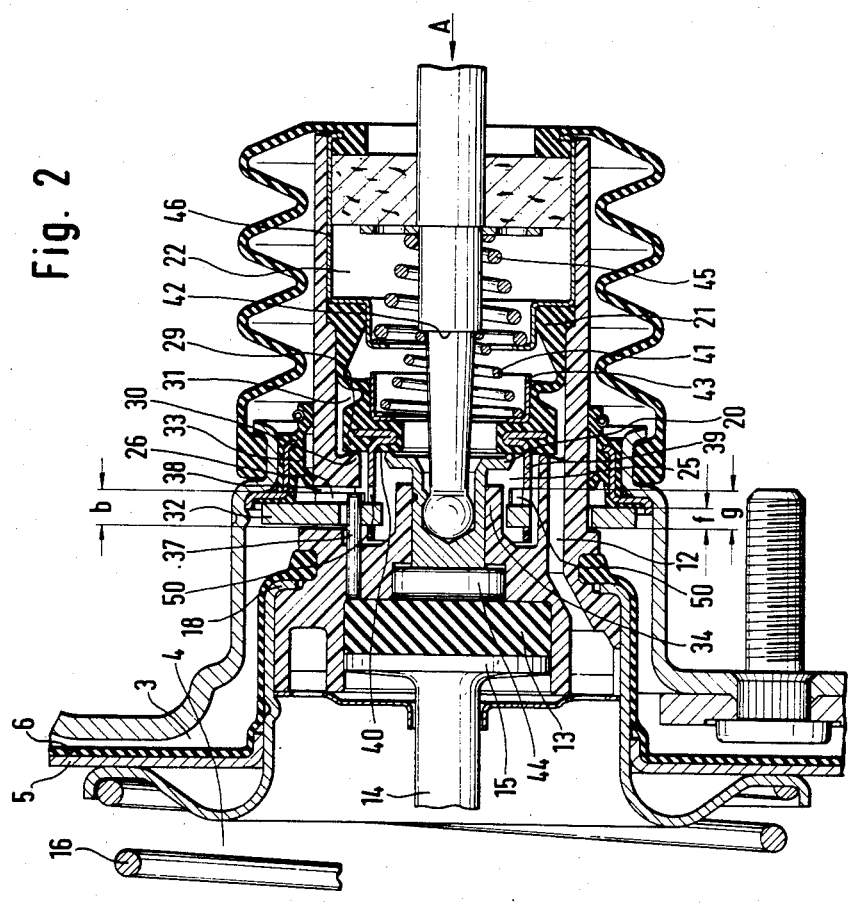
FIG. 2 is a longitudinal part-section through the control valve of the vacuum brake power booster according to FIG. 1 (shown on a larger scale)

In order that potential lost motion at the piston rod 8 is totally excluded or at least exactly defined, the shoulder 29 of the poppet valve 21 is armored with a rigid liner 39, so that in the brake release position shown in FIG. 2, the front area 40 at the master cylinder-side end of the shoulder 29 of the poppet valve 21 cannot slide to the right relative to the control valve body 11 any farther than shown in the drawing.

In order to safeguard that the shoulder 29 of the poppet valve 21 firmly abuts against the valve seat 30 in the braking position (that is when the piston rod 8 has slid in the direction of the arrow A—full braking position), there is provided a compression spring 41 one end of which rests against the shoulder 42 of the piston rod 8 and the other end of which urges the poppet valve 21 via a flange element 43 against the valve seat 30 in the closing direction of the poppet valve 21. Immediately upon actuation of the brake, that is as soon as the piston rod 8 moves in the direction of actuation (to the left as shown in the drawings), the valve passage between the front area 40 and the valve seat 20 of the control valve piston 10 is opened. A consequential movement of the shoulder 29 of the poppet valve 21 relative to the valve seat 30 of the control valve body 11 cannot take place in this instance, since the shoulder 29 is in abutment against the valve seat 30 ensuring that the front area 40 remains exactly in the same position relative to the control valve body 11 in which it is in the brake release position.

In the return position, that is when the control valve body 11 moves in the direction opposed to that indicated by the arrow A, the retractor spring 45 can urge the shoulder 29 of the poppet valve 21 sufficiently to the right via the piston rod 8 and the control valve piston 10 so that the shoulder 29 of the poppet valve 21 is lifted from the valve seat 30. In the course of the return movement of the control valve body 11, as soon as the transverse member 32 touches against the sealing ring 33 which is stationary (and rigidly coupled to the vacuum housing 1) the passage between the valve seat 30 and the front area 40 of the shoulder 29 is also closed by means of the liner 39.

For greater clarity the four essential operating phases of the booster are detailed in the following table.

(a) Release position: The transverse member 32 abuts against the stationary sealing ring 33. The poppet valve 21 abuts with its shoulder 29 against the valve seat 30 and with its front area 40 against the valve seat 20. The transverse member 32 has play within the guide 26, but firmly abuts against the liner 39 and pulls it to the left.

(b) Full braking position: The transverse member 32 is no longer in contact with the sealing ring 33. The spring 41 urges the poppet valve 21 onto the valve seat 30. The control valve piston 10 is lifted off the front area 40 under the action of the piston rod 8. The control valve body 11 has moved to the left.

(c) Partial braking position: This position is identical to the full braking position except that, the control valve piston 10 is seated once again with its sealing seat 20 on the front area 40.

(d) Return position: Via the control valve piston 10, the piston rod 8 has lifted the poppet valve 21 off the valve seat 30 against the force of the spring 41. The transverse member 32 is not yet in touch with the sealing ring 33, but has moved to the right within the guide 26.

What is claimed is:

1. A vacuum operated brake booster comprising an axially movable wall sealed relative to a vacuum housing, said booster having a piston rod adapted to be coupled to a brake pedal for movement between a brake released position and an actuated position serving to actuate control valve means by means of which a power chamber of the brake power booster is connectable selectively to vacuum or to an elevated pressure, in which a first valve is defined by a first valve seat on a control valve body portion of said control valve means and a poppet valve preloaded in the direction of said first valve seat and a second valve is defined by said poppet valve and a control valve piston portion of said control valve means, said control valve piston operatively connected to said piston rod, the axially movable wall being in effective linkage with said control valve body, a guide provided in said control valve body, said guide extending at right angles to the longitudinal axis of said control valve body and in effective linkage with a transverse member which extends through said guide with one end of the transverse member projecting beyond the peripherial surface of said control valve body to touch against said vacuum housing in the release position, the invention in which the poppet valve includes a front area at one end thereof facing said control valve piston defining a second valve seat, the front area being strengthened by a liner, said liner includes a portion which projects beyond said front area in the axial direction of the booster, the portion being provided with at least one recess engaged by said radially extending transverse member.

2. A vacuum-operated brake power booster as claimed in claim 1, in which the liner is configured as a bushing and includes a pair of recesses into which extend a pair of arms of said transverse member, said pair of arms extending parallel to each other, each of said arms having a free end projecting outwardly beyond said liner in a substantially radial direction through said guide in said control valve body to touch against a stationary sealing ring of said vacuum housing in the released position.

3. A vacuum-operated brake power booster as claimed in claim 1, in which said recess in said liner has sufficient width for said transverse member to penetrate with excess spacing thereby permitting a generally unobstructed passage of air in the radial direction.

4. A vacuum-operated brake power booster as claimed in claim 1, in which said liner is configured as a bushing and is provided wih radially extending arms at least partially embedded in rubber-elastomeric material of said poppet valve and in which said arms act to stiffen said second valve seat at said front area and at a shoulder of said poppet valve.

5. A vacuum-operated brake power booster as claimed in claim 1, in which the width of said guide is sized such that in the released position of the brake when said transverse member abuts against said stationary rubber sealing ring spacing is preserved on either side of said transverse member between said control valve body on the one hand and the transverse member on the other hand.

6. A vacuum-operated brake power booster as claimed in claim 1, in which said transverse member includes means extending from an internal radial surface of said transverse member for engaging said recess in said liner proximate said poppet valve, whereby said transverse member is in effective linkage directly with said poppet valve.

7. A vacuum-operated brake power booster as claimed in claim 6 in which the radial internal surface of said transverse member includes a fork-shaped configuration defining two radially extending arms which embrace substantially diametrically opposing portions of a neck of said control valve body adjacent said control valve piston with a predetermined degree of play, said arms being in effective linkage with said liner of said poppet valve.

8. A vacuum-operated brake power booster as claimed in claim 1, in which the end of said poppet valve opposite said one end thereof is rigidly coupled to said control valve body, said poppet valve having a bellows-shaped portion extending between a peripheral shoulder portion provided at said one end and the fixed end.

9. A vacuum-operated brake power booster as claimed in claim 8 further comprising, a compression spring supported at one end thereof on a shoulder on said piston rod and having a second end abutting against an external step provided on the inside wall of said poppet valve adjacent said poppet valve one end, whereby said poppet valve is subjected to the force of said spring and is biased in a closed position.

* * * * *